United States Patent [19]

DeBord

[11] Patent Number: 5,185,609
[45] Date of Patent: Feb. 9, 1993

[54] SIGNAL MONITOR UTILIZING DIGITAL SIGNAL PROCESSING

[75] Inventor: Claude R. DeBord, Independence, Mo.

[73] Assignee: Wilcox Electric, Inc., Kansas City, Mo.

[21] Appl. No.: 784,573

[22] Filed: Oct. 29, 1991

[51] Int. Cl.⁵ .............................................. G01S 7/40
[52] U.S. Cl. .................................. 342/173; 342/401; 342/49
[58] Field of Search ............... 342/401, 402, 403, 49, 342/173

[56] References Cited

U.S. PATENT DOCUMENTS

| | | |
|---|---|---|
| 3,521,278 | 7/1970 | Michnik et al. . |
| 3,523,295 | 8/1970 | Perkins . |
| 3,623,090 | 11/1971 | Gilbert et al. . |
| 3,659,291 | 4/1972 | Anthony . |
| 3,680,118 | 7/1972 | Anthony . |
| 3,685,053 | 8/1972 | Kirkpatrick . |
| 3,718,928 | 2/1973 | Stover et al. . |
| 3,787,671 | 1/1974 | Schmitt . |
| 3,800,125 | 3/1974 | Cleary, Jr. . |
| 3,803,611 | 4/1974 | Becker, Jr. . |
| 3,820,115 | 6/1974 | Stone . |
| 3,940,763 | 2/1976 | Paradise . |
| 3,968,494 | 7/1976 | Freter . |
| 3,988,733 | 10/1976 | Kohler . |
| 4,017,861 | 4/1977 | Wimmer et al. . |
| 4,069,412 | 1/1978 | Foster et al. . |
| 4,074,267 | 2/1978 | Knox . |
| 4,104,637 | 8/1978 | Nielson . |
| 4,454,510 | 6/1984 | Crow . |
| 4,471,357 | 9/1984 | Wu et al. . |
| 4,567,486 | 1/1986 | Breiholz ............................ 342/401 |
| 4,612,545 | 9/1986 | Asendorf et al. . |
| 4,616,227 | 10/1986 | Homma et al. . |
| 4,651,158 | 3/1987 | Nelson .................................. 342/45 |
| 4,728,957 | 3/1988 | Hethuin .............................. 342/401 |
| 4,810,947 | 3/1989 | Gourse et al. . |
| 4,843,399 | 6/1989 | Bongiorno et al. . |

OTHER PUBLICATIONS

Instruction Book VORTAC, VOR/DME, VOR Equipment, Type FA-9996, Section 2, vol. 2, cover page and pp. 2-73 through 2-98, (1981).

Primary Examiner—Theodore M. Blum
Attorney, Agent, or Firm—Chase & Yakimo

[57] ABSTRACT

A VOR monitor employs a microprocessor-based system in which, after initial analog detection of a transmitted VOR signal, the critical parameters of the signal are extracted by digital signal processing to ensure that the transmitted signal in space remains within tolerance. Initial processing to isolate the 30 Hz AM (variable) modulation component and the 30 Hz reference component is conducted in the time domain. The 30 Hz reference is recovered by FM quadrature demodulation which, as a by-product, yields data from which an rms calculation is made of the amplitude of the 9960 Hz subcarrier. Further digital processing is then conducted in the frequency domain to yield spectra from which critical parameters of the VOR signal are extracted, e.g. the phases of the 30 Hz components (determining azimuth), the modulation percentages of the 30 Hz variable and the 9960 Hz subcarrier, and the 9960 Hz FM deviation ratio. The identification tone of the transmitted VOR signal is recovered separately from the digital data by application of the Goertzel algorithm and verified by an autocorrelation analysis.

26 Claims, 9 Drawing Sheets

SIGNAL MONITOR UTILIZING DIGITAL SIGNAL PROCESSING

This invention relates to a method and apparatus for monitoring a VOR (vhf omnirange) signal to ensure that the transmitted signal in space remains within tolerance and, in particular, to a monitoring system employing digital signal processing exclusively to extract critical parameters of the VOR signal for evaluation.

VOR navigation systems provide azimuth information for aircraft in enroute navigation. The VOR signal is transmitted from a ground site and is composed of three basic signal components referred to as the 30 Hz variable, the 30 Hz reference, and a 1024 Hz identification tone. VOR has been used for decades for aircraft navigation, the transmitted signal being created in space in a well-known manner in order to provide azimuth or bearing information upon detection of the VOR signal at an airborne receiver. The bearing of an aircraft is given by the relative phase between the 30 Hz variable and the 30 Hz reference signals at the airborne receiver. Accordingly, it is essential to the accuracy of the bearing information that the components of the VOR signal be held to close tolerances with respect to frequency, relative amplitude and phase.

VOR in present use employs a carrier frequency in the range from 108 to 118 MHz. The 30 Hz reference is frequency modulated upon a 9960 Hz subcarrier which is amplitude modulated on the carrier. The 30 Hz variable appears on the VOR signal as amplitude modulation and is created when two double-sideband suppressed carrier signals are combined in the antenna system of the VOR transmitter. The 1024 Hz identification tone is also periodically amplitude modulated on the carrier and contains Morse code information as to the geographic location and validity of the VOR signal. Voice identification may also appear as amplitude modulation. Therefore, since four signals (subcarrier, 30 Hz variable, identification tone and voice) are applied to the carrier as amplitude modulation, their respective modulation levels must be closely controlled to assure that over-modulation does not occur. Also, it is essential that the identification code be correct. The 30 Hz reference, imposed on the subcarrier as frequency modulation, must conform to a prescribed deviation ratio. As azimuth is determined by the measured phase difference between the two 30 Hz signals at the airborne receiver, control of the relative phases of these two signals is of paramount importance. These are the critical parameters of the VOR signal which determine whether the transmitted signal in space is within tolerance.

Heretofore, in order to ensure that a VOR transmitter is operating properly, a monitor has been provided as a functional part of the transmitting system to measure the critical parameters that must be monitored at the transmitting site to ensure that the signal in space remains in tolerance. If certain of these critical parameters (referred to as executive parameters) are not observed, the monitor shuts down the transmitting system and personnel servicing the site are notified.

Prior VOR monitors rely heavily on analog circuitry to perform the necessary parameter extraction and evaluation. Considerations of cost, component life, physical space limitations and reliability lead to a conclusion that utilization of digital signal processing would be desirable, but difficulties have been presented in the adaptation of digital techniques to a VOR monitor. A standard approach would be to suitably locate probes or a receiving antenna in close proximity to the transmitting antenna and receive and detect the transmitted VOR signal, followed by conversion of the detected analog signal into digital data. However, transformation of this digital data, such as through the use of a fast Fourier transform, immediately converts the detected VOR signal to the frequency domain. Although data thus conditioned is thereby placed in a form suitable for the digital extraction of the parameters relating to the amplitude modulation components of the signal, information from the reference signal (frequency modulated on the subcarrier) is more readily derived from data in the time domain.

It is, therefore, the primary object of the present invention to provide a method and apparatus for extracting predetermined parameters of the VOR signal for evaluation to ensure that the transmitted signal in space remains within tolerance, utilizing a monitoring system that employs digital signal processing exclusively.

As a corollary to the foregoing object, it is an important aim of this invention to provide such a method and apparatus in which the VOR signal, after analog detection, is converted into digital data that is processed in the time domain to derive the reference signal applied to the subcarrier as frequency modulation.

In addition to the proceeding objects, it is a further objective of this invention to provide such a method and apparatus in which the digital data is also processed in the time domain to derive the 30 Hz variable and the amplitude of the subcarrier.

Another important object of this invention is to provide a method and apparatus as aforesaid in which the data in the time domain is subjected to digital demodulation to detect the 30 Hz reference.

Still another important object of the invention is to provide a VOR monitoring system in which data representing the detected VOR signal is first digitally processed in the time domain to derive modulation information including the 30 Hz reference, and then further digitally processed in the frequency domain to extract amplitude and phase information from the 30 Hz variable and the 30 Hz reference, followed by computation of critical parameters from the extracted information.

Yet another important object of this invention is to provide such a system which, through digital signal processing, also derives the amplitude of the subcarrier and the amplitude of the identification tone.

A further and important object is to provide a method and apparatus which utilizes digital signal processing exclusively to extract and evaluate critical parameters of a VOR signal including the respective modulation levels of the signals impressed on the carrier as amplitude modulation, the deviation ratio of the 9960 Hz subcarrier and the relative phase of the 30 Hz variable and reference signals.

Still further, an important object of this invention is to provide an improved method and apparatus for digitally demodulating the VOR subcarrier through the employment of FM quadrature demodulation and, preferably, by subjecting the entire digital data representing the detected VOR signal, without bandlimiting, to FM quadrature demodulation in a manner such that the final demodulated waveform of the 30 Hz reference and the amplitude of the subcarrier are both provided.

Additionally, it is an important object of this invention to provide a method and apparatus for verifying that the code characters of the transmitted identification code of a navigation signal are correct, through the utilization of a digital correlation technique that compares the measured code sequence with a master code sequence.

SUMMARY OF THE INVENTION

The VOR monitor of the present invention is a microprocessor-based system in which, after initial analog detection of the transmitted VOR signal, all further functions are accomplished by digital signal processing. The monitor hardware includes an analog-to-digital converter that digitizes the detected VOR analog input by sampling the input signal at a rate of 1024 samples every 33.3 milliseconds (msec.). Software processes the digital data thus obtained through the use of digital filters, digital FM quadrature demodulation and fast Fourier transforms.

Initial processing is conducted in the time domain, the objective being to isolate the 30 Hz variable component and the 30 Hz reference and to determine the amplitude of the 9960 Hz subcarrier. The 30 Hz variable component is separated from the composite digital data with a lowpass filter having a cutoff frequency of 1500 Hz. This provides a low frequency data set at the output of the lowpass filter which contains the 30 Hz variable component.

The entire digital data from the output of the A/D converter, without bandlimiting, undergoes FM quadrature demodulation which results in the detection of the 30 Hz reference and, as a by-product, yields data from which an rms calculation is made of the amplitude of the 9960 Hz subcarrier. FM quadrature demodulation is accomplished by subjecting the data to a Hilbert transform, both the real and imaginary products then being filtered through decimating lowpass filters to remove unwanted products and reduce the data set down to a manageable size. The arctangent of this data set is taken through the use of CORDIC algorithms. A discontinuity correction routine resolves the discontinuity inherent in the discontinuous nature of the arctangent function, resulting in the reconstruction of the final demodulated waveform of the 30 Hz reference in its true phase relationship.

At this stage further digital processing is conducted in the frequency domain. Each of the detected 30 Hz modulation components, i.e. the reconstructed 30 Hz reference and the 30 Hz variable isolated by lowpass filtering, is subjected to a fast Fourier transform which converts these periodic signals from the time domain to the frequency domain and extracts all of the additional information required to compute the VOR executive parameters. The computation is accomplished utilizing the appropriate equations to recover the phase of the 30 Hz variable and the 30 Hz reference, the AM modulation percentage of the 30 Hz variable and 9960 Hz subcarrier, and the 9960 Hz FM deviation ratio. If these computed parameters are not within prescribed tolerance limits, the monitor shuts down the VOR transmitter.

The 1024 Hz identification tone is recovered separately from the composite digital data by application of the Goertzel algorithm and recorded in memory. Utilizing a binary autocorrelation analysis, the modulation record is compared with a master code sequence to either verify as correct, or reject as incorrect, the transmitted identification code. If the transmitted code does not pass the correlation test, the monitor shuts down the VOR transmitter.

MONITOR PROCESS IN GENERAL

The VOR monitor of the present invention is typically employed at the VOR transmitting site to evaluate the transmitted signal and shut down the VOR transmitter if the executive parameters are not within the prescribed tolerances. Systems of this type employing analog signal processing are well known and utilize a separate antenna or probe spaced from, but in close proximity to, the transmitting antenna to obtain the monitor input signal. In response to a transmitter failure or a deviation from the prescribed tolerance limits, the monitor may initiate and effect the transmission of an alarm report along dedicated or non-dedicated telephone lines to advise personnel that service the equipment as well as effect the shutdown of the transmitter. Accordingly, the description to follow is concerned with signal processing and parameter extraction by the monitor electronics as inputting the signal to the system and the output functions of the monitor are conventional. It should be understood, however, that the present invention may also be employed in a portable, mobile or fixed location unit remote from a VOR transmitting site to be monitored.

Figure 1:
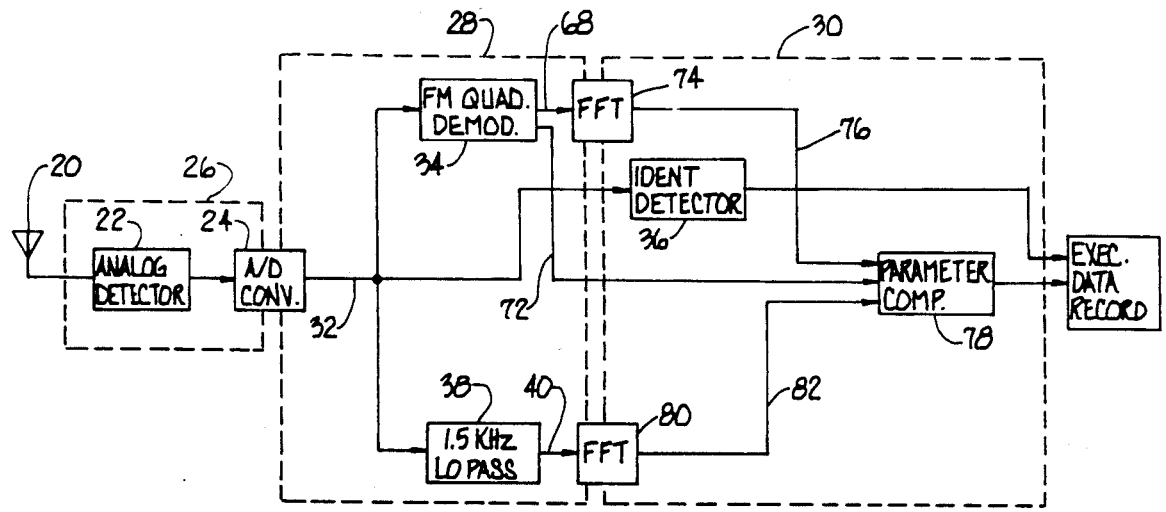
FIG. 1 is a process flow diagram of the VOR monitor of the present invention.

Referring to FIG. 1, the monitor antenna or probe is illustrated at 20 and, as mentioned above, is suitably located at the VOR transmitting site for receiving the VOR signal that is being radiated from the transmitting antenna (not shown). The received signal is fed to an analog detector 22 from which the detected modulation components of the VOR signal are delivered to an analog-to-digital (A/D) converter 24. The broken line 26 enclosing the detector 22 and a portion of the A/D converter 24 is illustrative of the fact that the signals thus far processed are in the analog domain. Digital signal processing (DSP) commences at the output of the A/D converter 24 as represented by a broken line 28 enclosing elements of the process (to be described) in which the output data from the converter 24 is digitally processed in the time domain. Later stages of digital processing are accomplished in the frequency domain within the portion of FIG. 1 enclosed by a broken line 30.

The output of the analog detector 22 contains the modulation components that comprise the information carried by the transmitted VOR signal, including the 9960 Hz subcarrier, the 30 Hz variable component, the 1024 Hz identification tone and any voice modulation that may be present. At this point, the 30 Hz reference signal remains as frequency modulation on the subcarrier. The executive parameters are to be extracted and evaluated from this demodulated signal.

In a VOR navigation system, the executive parameters are as follows:

1. Azimuth, represented by the phase difference between the 30 Hz variable and the 30 Hz reference signals;
2. The modulation level of the 30 Hz AM (variable) component;
3. The modulation level of the 9960 Hz AM component (subcarrier);
4. The deviation ratio of the 9960 Hz component (ratio of maximum deviation from center frequency to 30 Hz, the frequency of the reference signal); and
5. The code sequence of the 1024 Hz identification component.

The nominal modulation levels are 30 percent for each of the 9960 and 30 Hz AM components, and 5 percent for the 1024 Hz identification component. The nominal deviation ratio is 16.

The detected analog signal is digitized in A/D converter 24 by sampling the input signal at a rate of 1024 samples every 33.3 msec. By definition, The number of samples, Sam=1024;
The sampling interval, k=1 to 1024;
The DC level as a percent of modulation, DC=100;
The window size frequency, Win=30 Hz; and
The number of frequencies in the complex waveform, n=1 to 3.

Assuming that the monitor antenna 20 is located due north of the VOR transmitting antenna (30 Hz components in phase), the waveform setup array is defined as follows:

| AM Components | | | FM Components | | |
|---|---|---|---|---|---|
| Freq (Hz) $F_n =$ | % Mod. $A_n =$ | Phase (deg) $A\theta_n =$ | Freq (Hz) $FM_n =$ | Dev. $B_n =$ | Phase (deg) $B\theta_n =$ |
| 30 | 30 | 0 | 0 | 0 | 0 |
| 1024 | 5 | 0 | 0 | 0 | 0 |
| 9960 | 30 | 0 | 30 | 16 | 0 |

For "n" being a number of individual frequencies ranging from 1 through 3, and "I" being one of 1024 samples in a given period, the amplitude produced by the sum total of the individual frequencies for any given sample "I" is determined by the following expression:

$$I_k = DC + \sum_n A_n \cdot \sin\left[\frac{2 \cdot \pi \cdot k \cdot F_n}{Win \cdot Sam} + \left[B_n \cdot \sin\left[\frac{2 \cdot \pi \cdot k \cdot FM_n}{Win \cdot Sam} + \frac{\pi \cdot B\theta_n}{180}\right]\right] + \frac{\pi \cdot A\theta_n}{180}\right]$$

Figure 2:
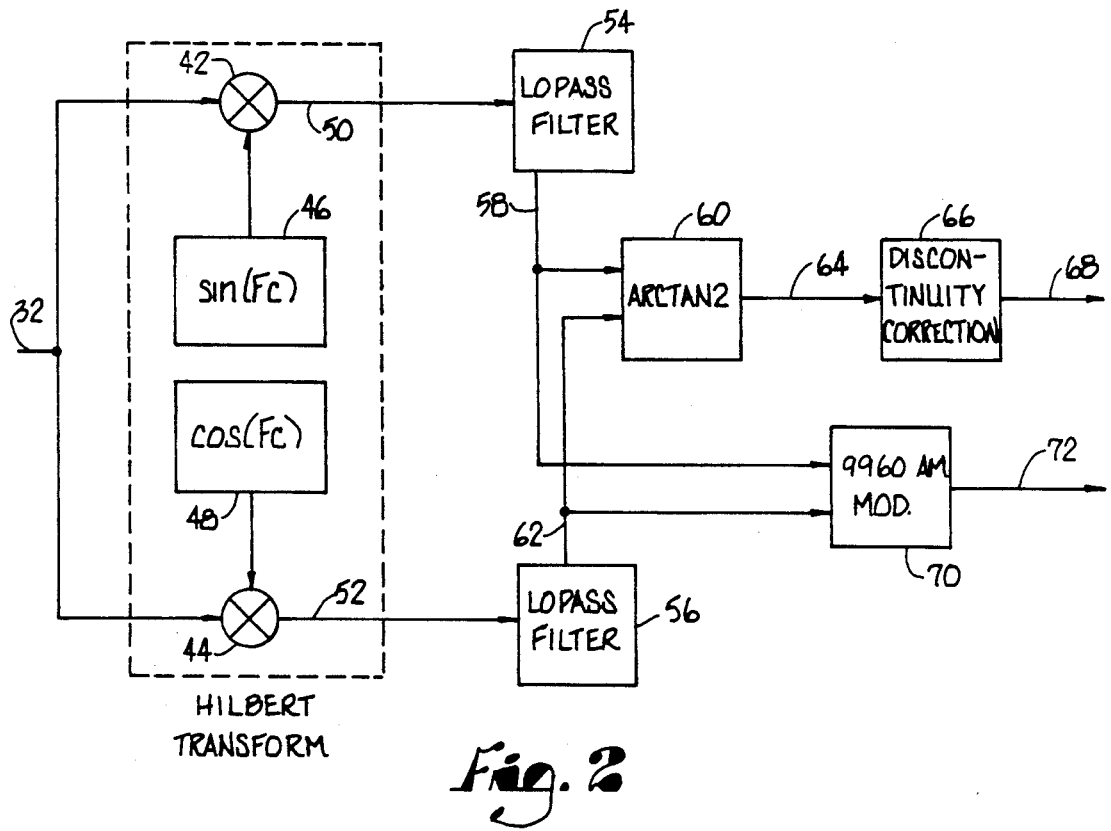
FIG. 2 is a flow diagram showing the FM quadrature demodulation process in detail.
Figure 3:
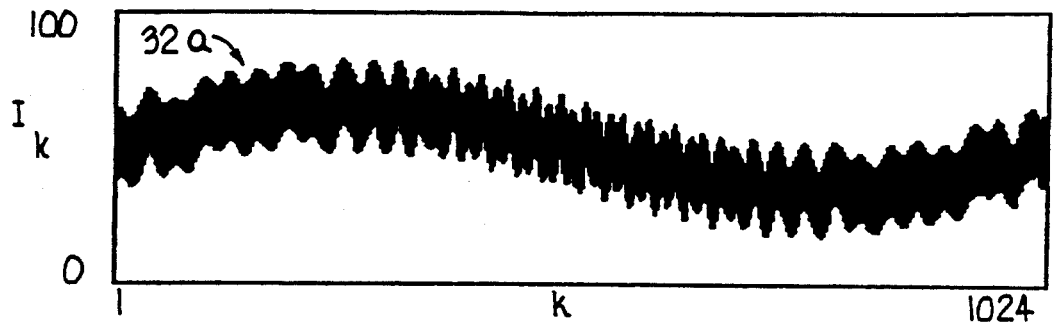
FIG. 3 is an illustration of the composite waveform data of the detected VOR signal after analog-to-digital conversion.

A data line 32 from the output of the A/D converter 24 carries the demodulated signal in digital form, the composite waveform data from an exemplary detected VOR signal being shown at 32a in FIG. 3. $I_k$ is plotted against the sampling interval k in the graphical representation of FIG. 3. (For clarity and ease in relating the waveform data and spectra graphs herein to the flow diagrams of FIGS. 1 and 2, the corresponding graph is designated by the same reference numeral with the addition of the "a" notation.)

The composite data on line 32 is subjected to FM quadrature demodulation, detection of the identification tone, and filtering of the low frequency spectra as illustrated in FIG. 1 by the three branches of data line 32 that extend to an FM quadrature demodulator 34, an identification detector 36 and a 1.5 KHz lowpass filter 38. The FM demodulator 34 subjects the composite data on line 32 to digital demodulation to detect the 30 Hz reference signal and, as a by-product, yields data with respect to the amplitude of the 9960 Hz subcarrier, as will be discussed hereinbelow. The lowpass filter 38 isolates the portion of the composite data below the cutoff frequency (1500 Hz) to provide a low frequency data set at its output 40 that includes the 30 Hz variable component. The identification detector 36 recovers the keying sequence of the Morse code groups by a binary autocorrelation analysis.

Figure 4:
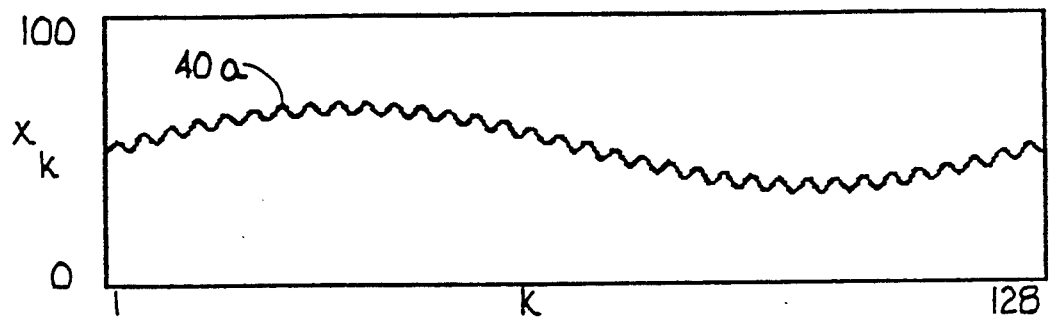
FIG. 4 is an illustration of the waveform of the low frequency data set remaining after filtering the composite data.

Referring first to the action of the lowpass filter 38, the low frequency data set at its output 40 is illustrated by the waveform 40a in FIG. 4. The ordinate $X_k$ is plotted against the sampling interval k. (The ordinate scales of FIGS. 3 and 4 are in arbitrary units of 0-100.) As displayed in FIG. 4 the 9960 Hz subcarrier has been removed from the composite VOR signal, leaving the 30 Hz variable and the 1024 Hz identification tone. This low frequency data set, decimated to 128 points, is now ready to be submitted to further processing discussed hereinbelow in order to remove amplitude and phase information.

Now referring to the FM quadrature demodulation process, the demodulator 34 is shown in detail in FIG. 2. It will be appreciated from FIG. 1 that the entire demodulation process to be described is conducted in the time domain, i.e. within that portion of the total process enclosed by the broken line 28.

The large deviation ratio, typically 15 to 17, places limitations on most methods of digital demodulation of the FM subcarrier. In addition to quadrature detection, zero crossing detection and instantaneous frequency detection are possible alternatives. Quadrature detection, however, provides very accurate demodulation of an FM carrier with exceptional resolution, and in the instant invention provides data from which an rms calculation is made of the amplitude of the 9960 Hz subcarrier. Extraction of this amplitude is necessary because the modulation level of the subcarrier is one of the executive parameters.

Figure 8:
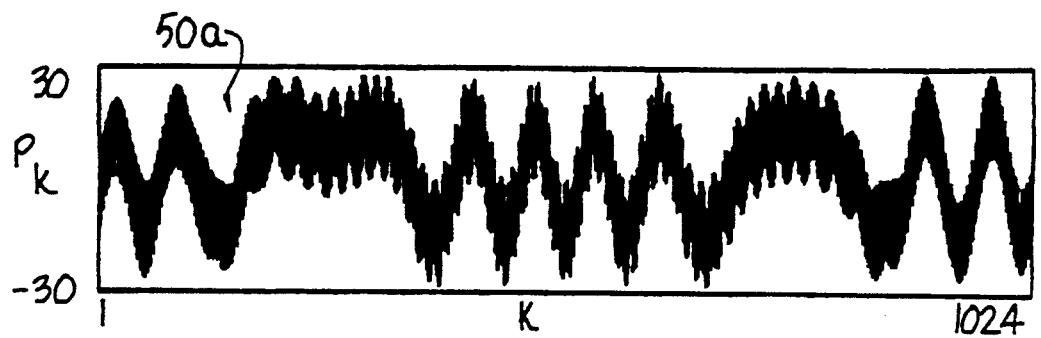
FIG. 8 is an illustration of a waveform obtained by the use of the Hilbert transform in the FM demodulation process.

Referring to FIG. 2, the composite data $I_k$ on data line 32 (illustrated by waveform 32a in FIG. 3) is received by a pair of digital mixers 42 and 44 which also receive subcarrier-frequency signals from quadrature digital oscillators 46 and 48 respectively. The composite data $I_k$, without any filtering or bandlimiting, is thus subjected to a Hilbert transform, the output 50 of the mixer 42 comprising a transformed real data set $P_k$ illustrated by the waveform 50a in FIG. 8. The output 52 of mixer 44 comprises a transformed imaginary data set $Q_k$. These real and imaginary data sets $P_k$ and $Q_k$ are then subjected to decimating lowpass filters 54 and 56 respectively, each of which is a finite input response (FIR) anti-symmetrical digital filter having a low pass response from DC to 1500 Hz. After being filtered and decimated to 128 points, the real data set $S_i$ and the imaginary data set $C_i$ at the filter outputs 58 and 62 are further processed at 60 by CORDIC algorithms in order to obtain the arctangent thereof. The result of the arctangent computation is delivered on output data line 64. Being a discontinuous function, the arctangent is corrected as represented by the discontinuity correction process step 66 to provide a final demodulated waveform $G_i$ at demodulator output 68 in its true phase relationship.

Figure 6:
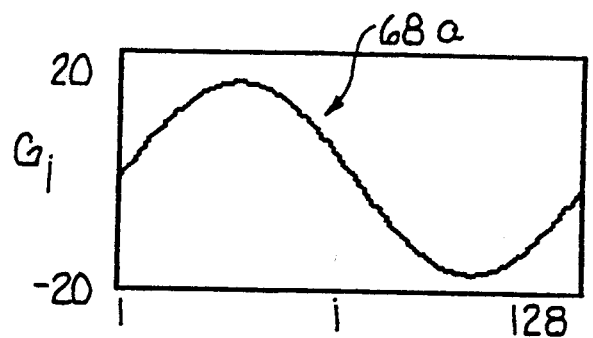
FIG. 6 illustrates the final demodulated waveform obtained after FM quadrature demodulation.
Figure 9:
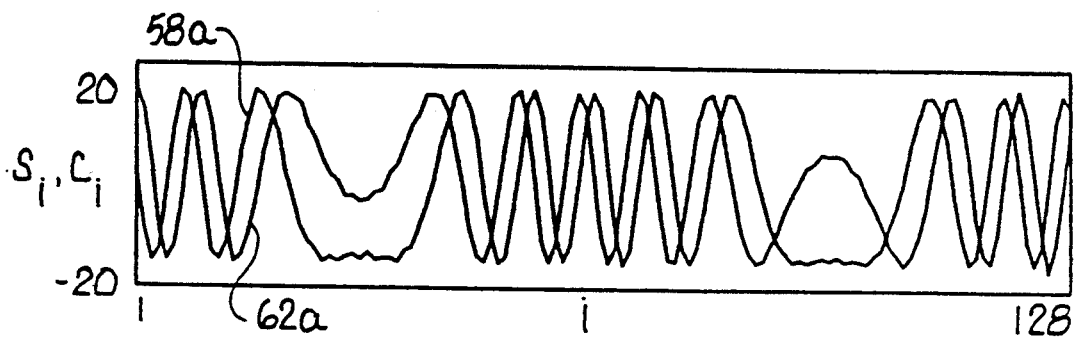
FIG. 9 is a diagram showing the waveforms from the two lowpass filters employed in FM demodulation.
Figure 10:
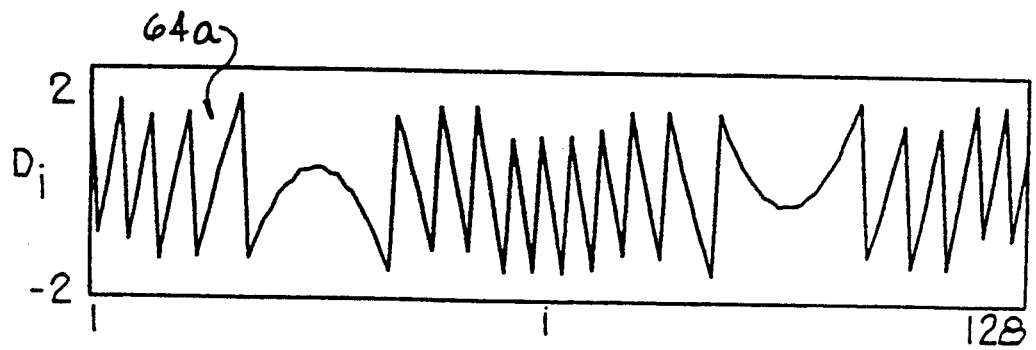
FIG. 10 is an illustration of the waveform produced during FM demodulation by the arctangent function.

The waveform of the real data set at the output 58 of filter 54 is shown at 58a in FIG. 9; the waveform of the imaginary data set at output 62 of filter 56 is shown at 62a in FIG. 9. The waveform 64a resulting from the arctangent function is illustrated in FIG. 10. The final demodulated waveform of the signal $G_i$ is illustrated at 68a in FIG. 6 and is the 30 Hz reference.

It should be appreciated that frequency modulation can be viewed as a change in phase with respect to the phase of the carrier (subcarrier here) at the center frequency. The purpose of quadrature demodulation is to determine the phase relationship of the modulated subcarrier and, therefore, accomplish the desired demodulation. The Hilbert transform is thus employed to convert the subcarrier data into a form that represents the changing phase of the signal. The Hilbert transform equations are:

$$P_k = I_k \cdot \sin\left[\frac{2 \cdot \pi \cdot k \cdot 9960}{Win \cdot N}\right]$$

$$Q_k = I_k \cdot \cos\left[\frac{2 \cdot \pi \cdot k \cdot 9960}{Win \cdot N}\right]$$

Figure 11:
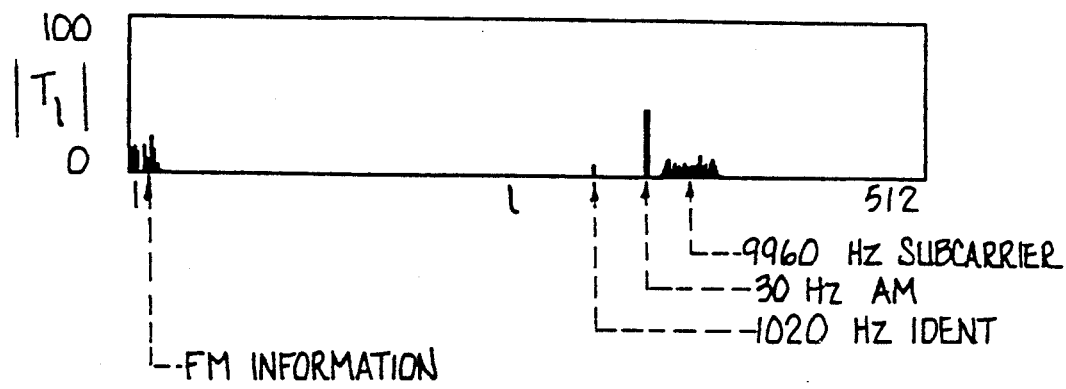
FIG. 11 shows the spectrum produced by the Hilbert transform.

As shown in FIG. 11, the Hilbert transform modifies the spectrum into a mirror image such that frequency components which were once low in frequency are now close to the subcarrier frequency, and those around the subcarrier are now close to DC. (T=xfft(P), and l=1 to 512.) Therefore, the FM information can be isolated by lowpass filtering the transformed signal, which is accomplished by filters 54 and 56. This not only removes the 9960 Hz subcarrier but also removes the DC to 3000 Hz signals (which now reside from 6960 Hz to 9960 Hz).

The real and imaginary components $P_k$ and $Q_k$ from the output of the Hilbert transform are filtered by the following FIR filter equations:

$$S_i = \left[\sum_j coeff_j \cdot [P_{mod((k+j),1024)}]\right]$$

$$C_i = \left[\sum_j coeff_j \cdot [Q_{mod((k+j),1024)}]\right]$$

Each of the filters 54 and 56 utilizes a set of nine coefficients (coeff in the above equations, where j=1 to 9) to give the filter a low pass response from DC to 1500 Hz. The nine coefficients are:

−0.03200599
0.00385977
0.02237109
0.00759867
−0.01017332
0.01529558
0.11006542
0.23546263
0.29565228

Since the bandwidth has now been effectively reduced to 1500 Hz, the number of samples required to represent the waveforms can be reduced to 128. The demodulated data being embedded within the phase of the subcarrier, it is recovered by taking the arctangent of the complex data.

$$D_i = a\tan\frac{C_i}{S_i}$$

As may be appreciated from the exemplary illustration of $D_i$ seen in FIG. 10 (waveform 64a), the arctangent is a discontinuous function. It is corrected through the use of an algorithm to provide the reconstructed output $G_i$ (waveform 68a in FIG. 6), as follows:

$E_i = D_i - D_{i-1}$, where $E_i$ is the differential phase

If $||E_i>1|$, then $G_i = G_{i-1} + E_{i-1}$ or, if not, then $G_i = |G_{i-1} + E_i|$.

With respect to the determination of the amplitude of the subcarrier, this is accomplished in the present invention even though the Hilbert transform and subsequent filtering have completely removed the subcarrier data. Since the remaining data exists in complex form and was derived from composite data that included the subcarrier, the amplitude modulation of the FM subcarrier can be computed from the rms of the magnitude of the complex waveforms $S_i$ and $C_i$. Stated mathematically:

$$AMrms = \sqrt{2 \cdot \left[\sum_i \frac{S_i^2 + C_i^2}{64}\right]}$$

$AMrms = 30$

The rms computation step is illustrated at 70 in FIG. 2, the computed amplitude appearing on the output data line 72.

The reconstructed 30 Hz reference (waveform 68a) on output data line 68 is subjected to a fast Fourier transform (FFT) operation to convert the data to the frequency domain for further processing. The FFT operation is illustrated at 74 in FIG. 1 and its output appears on data line 76 which extends to the final step of the process, VOR parameter computation 78. Similarly, the low frequency data set at the output 40 of the low-pass filter 38 is subjected to a FFT operation at 80, the transformed information appearing on data line 82 for use in parameter computation. The spectra of the transformed data on line 76 is illustrated at 76a in FIG. 7, and the spectra of the transformed data on line 82 is illustrated at 82a in FIG. 5. In both graphs the rms value or magnitude is the ordinate and frequency is the abscissa.

Figure 7:
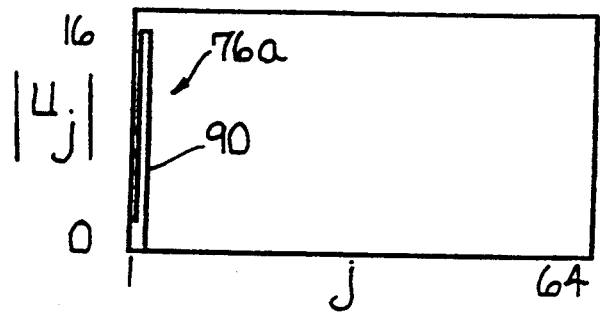
FIG. 7 is a diagram showing the demodulation spectra after the demodulated waveform of FIG. 6 is subjected to a fast Fourier transform.

Both of the FFTs herein employ forward transformation and convert the sampled input signal (time domain) into its corresponding harmonic spectrum (frequency domain). The output of the forward FFT arranges the spectrum as harmonics based on a power of 2, i.e. 30 Hz, 60 Hz, 90 Hz etc. These harmonics are referred to as "bins." In FIG. 5, bins 1 and 2 contain the DC component 84 and the 30 Hz AM component 86, respectively. The amplitude of the DC component is 100 on the ordinate scale, representing 100 percent of the amplitude of the RF carrier. The 1024 Hz identification tone 88 is at bin 35. In FIG. 7, the 30 Hz reference component 90 is at bin 2.

Figure 5:
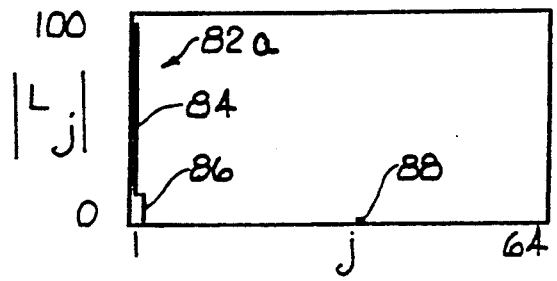
FIG. 5 is a diagram showing the low band spectra resulting from the fast Fourier transform of the low frequency data set.

Each of the FFT operations preferably employs the radix-2 algorithm. Decimation is accomplished to prune the sampled data sets to 128 points. FIGS. 5 and 7 show the magnitude output (Mag) of the transform equations L=fft(X), where X is the data illustrated in FIG. 4 by waveform 40a; and U=fft(G), where G is the data illustrated in FIG. 6 by waveform 68a. In FIGS. 5 and 7, $$Mag = \sqrt{Real_f^2 + IMag_f^2}$$

Accordingly, the magnitude of the transformed information is equal to the square root of the sum of the squares of the real and imaginary parts, and the phase can be computed by taking the arctangent of the imaginary part divided by the real.

CODE IDENTIFICATION PROCESSING

The monitoring of the 1024 Hz identification tone is performed with software algorithms and is represented by the identification detector 36 in the process flow diagram of FIG. 1. The 1024 Hz identification signal is a Morse code representation of a 3 to 4 character string broadcast in order to identify the geographic location of the VOR station. Each Morse code character is comprised of dots and dashes. Dots are 100 milliseconds in length and dashes are 300 milliseconds, or 3 dot lengths. The spacing between the dots and dashes that make up a character is 100 milliseconds and the spacing between characters is 300 milliseconds. For example the Morse code sequence for KDAA would be "-.- - ". If this code is sampled once every 100 milliseconds and a binary "1" represents the presence of the tone and a "0" represents its absence, the KDAA identification code would appear as follows:

11101011100011101010001011100010111

However, digital detection of the code is not as straightforward as it would appear. In the monitoring system of the present invention, the identification tone is detected in realtime and a mechanism is provided for rejecting voice and other audio components that may be present in the transmitted signal.

The Goertzel algorithm is utilized. To implement the algorithm, the coefficient F is computed for the frequency of interest (1024 Hz). The Goertzel algorithm requires that the coefficient be a whole integer; one of the sample lengths that meets this requirement is 1020 data points. Since the length of the data process becomes a tradeoff between speed and accuracy, 1020 data points represents a comprise that yields high accuracy as the algorithm is reasonably fast. On this basis, the coefficient F is computed by:

$$F = \text{Number of samples} \cdot \frac{\text{freq of interest}}{\text{sampling rate}}$$

$$\text{Therefore, } F = 1020 \cdot \frac{1024}{30720}$$

$$F = 34$$

The feedback portion of the Goertzel algorithm is defined by the following feedback stage equation:

$$Q_{k+1} = 2 \cdot \cos\left[\frac{2 \cdot \pi \cdot F}{N}\right] \cdot Q_k - Q_{k-1} + \frac{2 \cdot I_k}{N}$$

After iterating the feedback stage for 1020 samples, data is processed in the feedforward stage to produce a complex representation of the detected tone.

$$Real = \cos\left[\frac{2 \cdot \pi \cdot F}{N}\right] \cdot Q_N - Q_{N-1} \quad \text{(Real feedforward equation)}$$

$$Imag = \sin\left[\frac{2 \cdot \pi \cdot F}{N}\right] \cdot Q_N \quad \text{(Imaginary feedforward equation)}$$

Since phase is of no concern in identification code recovery, only the magnitude (Mag) is computed.

$$Mag = \sqrt{Real^2 + Imag^2}$$

$$Mag = 5.0$$

As set forth in the definition of the VOR waveform, 5 percent is the nominal modulation level for the 1024 Hz identification signal.

To avoid noise and voice that can cause false triggers, a finite number of modulation samples is recorded in memory and an autocorrelation technique is employed. The expected (master) identification code is transformed into a data sequence identical to the one that is expected to be recovered. Starting from the beginning of the recovered data record $D_k$, each value is multiplied by its corresponding value in the correlation sequence, after which all the resulting values are summed together to form a correlation sum. If the two sequences match, then the correlation sum will be large. On the other hand, if the two sequences do not match, the sum will be small. The correlation sequence is then shifted one place relative to the data sequence and the correlation occurs again. This process continues until a theoretical sum is obtained, indicating a match, or the data stream is exhausted.

Figure 12:
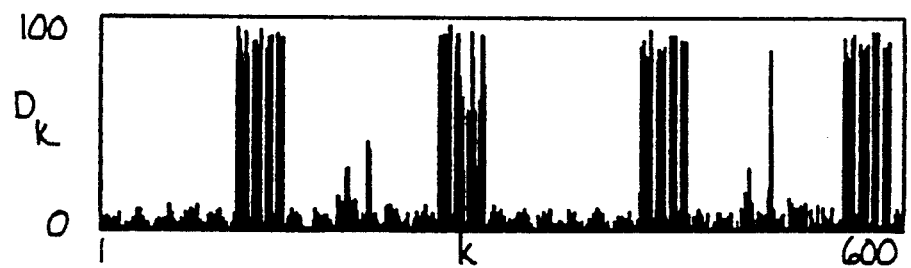
FIG. 12 is a 60-second code identification modulation record.

A 60-second identification modulation record illustrated in FIG. 12 shows four groups of code identification recovery by use of the Goertzel algorithm. In between the groups some voice modulation and the noise floor is visible. To reduce the amount of computation involved, a modulation threshold (T) is determined by finding the average modulation level (energy density average) over the record. As shown below, the threshold for the record of FIG. 12 is 17.

$$T = \sum_k \frac{D_k}{600} = 17$$

Figure 13:
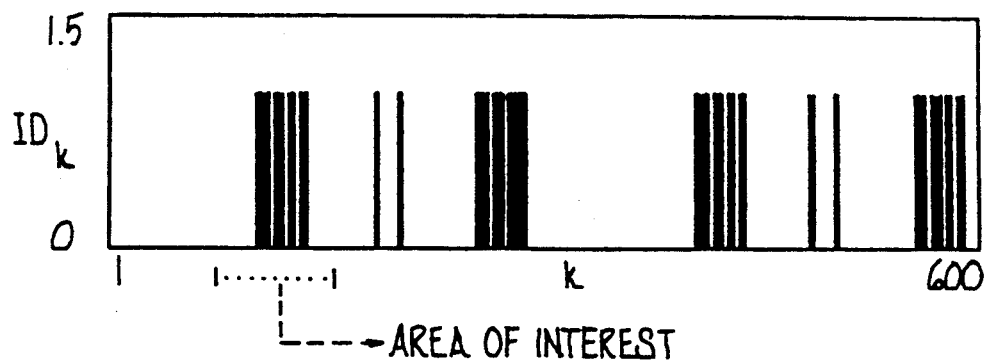
FIG. 13 shows a record similar to FIG. 12 but with the modulation removed below the threshold.
Figure 14:
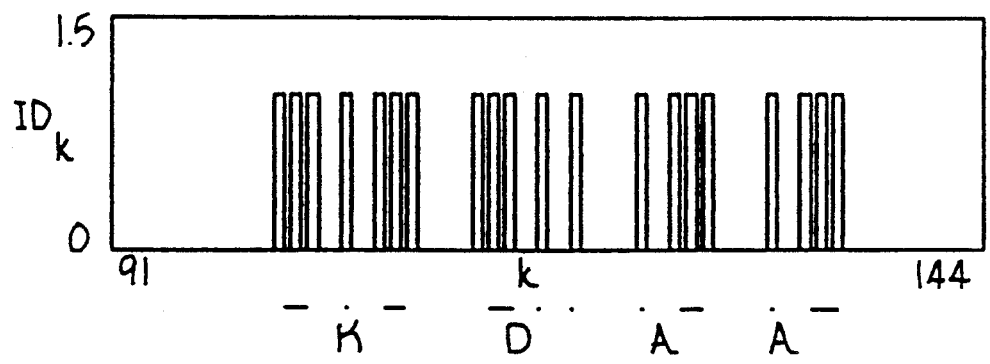
FIG. 14 is an exploded record of one of the code groups seen in FIG. 13.

If any value exceeds the threshold it is forced to a binary "1" and if not it is forced to binary "0" as shown in FIG. 13. Exploded examination of one of the code groups (area of interest in FIG. 13) reveals the recovered "KDAA" keying sequence shown in FIG. 14. By computing the maximum correlation sum for a particular pattern, a lower limit can be set in order to allow a specified number of bit errors before an identification monitoring error is indicated.

THE MONITOR HARDWARE

Figure 15:
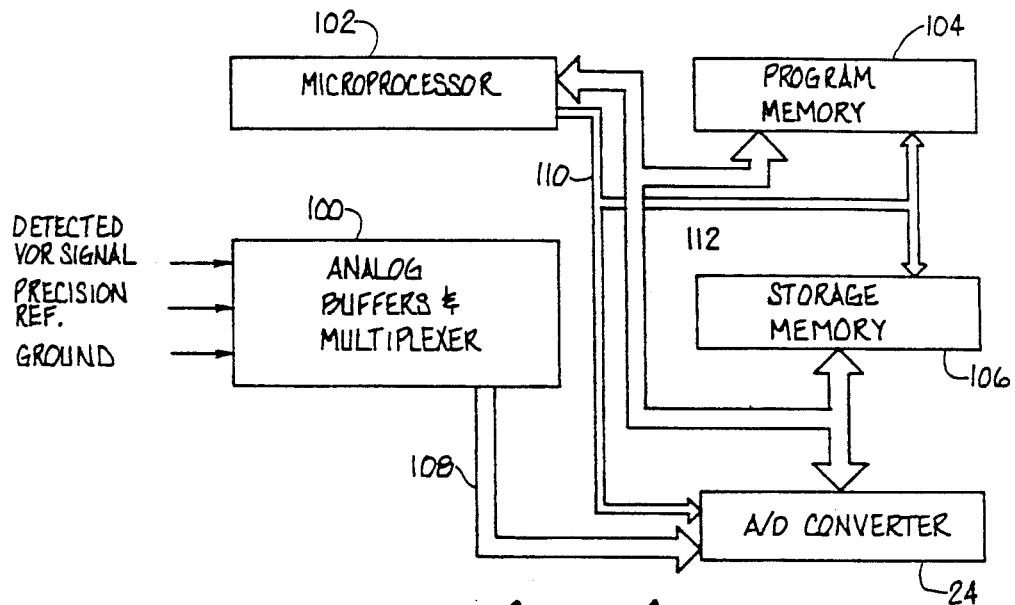
FIG. 15 is a block diagram showing the architecture of the monitor hardware.

The VOR monitor of the present invention employs analog circuit components and computer hardware and software as previously discussed. The architecture is illustrated in FIG. 15 where it may be seen that there are five functional units comprising analog buffers and a multiplexer 100, the A/D converter 24, a microprocessor 102, a program memory 104 and a storage memory 106. An analog signal bus 108 extends from the buffers and multiplexer 100 to the signal input of the A/D converter 24. An address bus 110 extends from the microprocessor 102 to the A/D converter 24 and the memories 104 and 106. A digital data bus 112 interconnects the A/D converter 24, the microprocessor 102 and the memories 104 and 106. The microprocessor 102, program memory 104 and storage memory 106, implemented by software to be discussed, process the data in both the time domain and the frequency domain illustrated in the process flow diagram of FIG. 1 by the functions enclosed within the broken lines 28 and 30.

The analog buffers and multiplexer 100 present the front end of the monitor. Analog buffers are employed to isolate the analog circuitry from the external interface, and the analog multiplexer allows the selection of either the detected VOR signal, an on-board precision voltage reference, or a ground reference (circuit ground). This is represented in FIG. 15 by the three inputs to the buffer/multiplexer 100. The precision reference and circuit ground are used to calibrate the measurement algorithms of the programs.

The A/D converter 24, discussed in detail hereinabove, is controlled by the microprocessor 102 via the address bus 110. The digital conversions of the detected analog signal are transferred to the storage memory 106 via the data bus 112. Representative resolution of the numerical data is between 12 and 16 bits.

The microprocessor 102 includes a 16 bit (or better) central processing unit (CPU), an arithmetic logic unit (ALU) and control circuitry. It is used in conjunction with the program memory 104 to provide the autonomous operation of the monitor system.

The program memory 104 is that portion of the system in which the executable instructions reside. It may consist of either volatile static or random access memory devices, or non-volatile storage such as an EPROM (electrically programmed read only memory) or ROM (read only memory). The program memory 104 interfaces with the data bus 112 and address bus 110 under the control of the microprocessor 102 for fetching program instructions.

The storage memory 106 is where records, variables, data from the A/D converter 24 and intermediate results reside. This memory consists of a mixture of both volatile static or random access memory, and non-volatile memory for record storage. The storage memory 106 interfaces with the data bus 112 and address bus 110 under the control of the microprocessor 102 for the storage and fetching of data.

THE SOFTWARE

Figure 16:
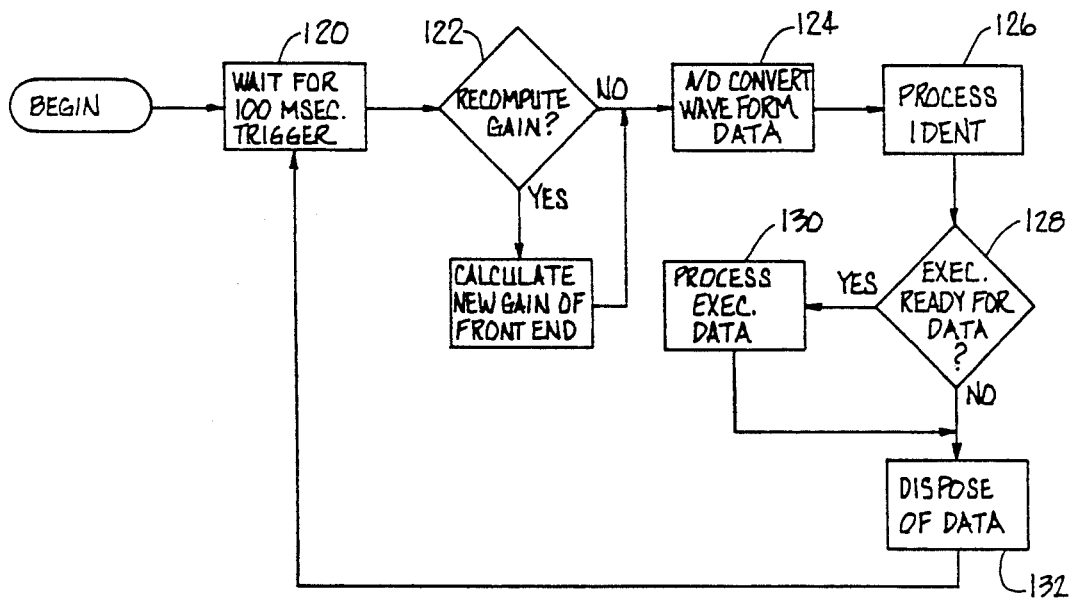
FIG. 16 is a top level logic flow diagram showing the software architecture.

FIG. 16 is a logic flow diagram of the software architecture. Data is acquired every 100 msec. as indicated by the "wait for 100 msec. trigger" procedure which initiates the program loop. One hundred milliseconds is selected as the time between successive data acquisitions because this is the minimum interval of the identification code as described above. The next procedure 122 recomputes the gain of the front end of the monitor to provide an automatic gain control that maintains the A/D converter 24 (FIGS. 1 and 15) within its dynamic range. The "A/D convert" procedure 124 is the software component of the A/D converter 24.

The "process ident" task 126 performs the Goertzel algorithm and the autocorrelation analysis to verify the identification code, as represented by the identification detector 36 in the process flow diagram of FIG. 1. The decisional procedure 128 provides the concurrent "process exec. data" task 130 with raw data if it is ready, which will occur every 500–800 msec. The process task 130 instructs the digital signal processing of the output data from the A/D converter 24 as previously described with reference to the FM quadrature demodulator 34, the 1.5 KHz lowpass filter 38, the FFT's 74 and 80, and parameter computation 78 in FIG. 1. The raw data is disposed of by a final procedure 132.

Figure 17:
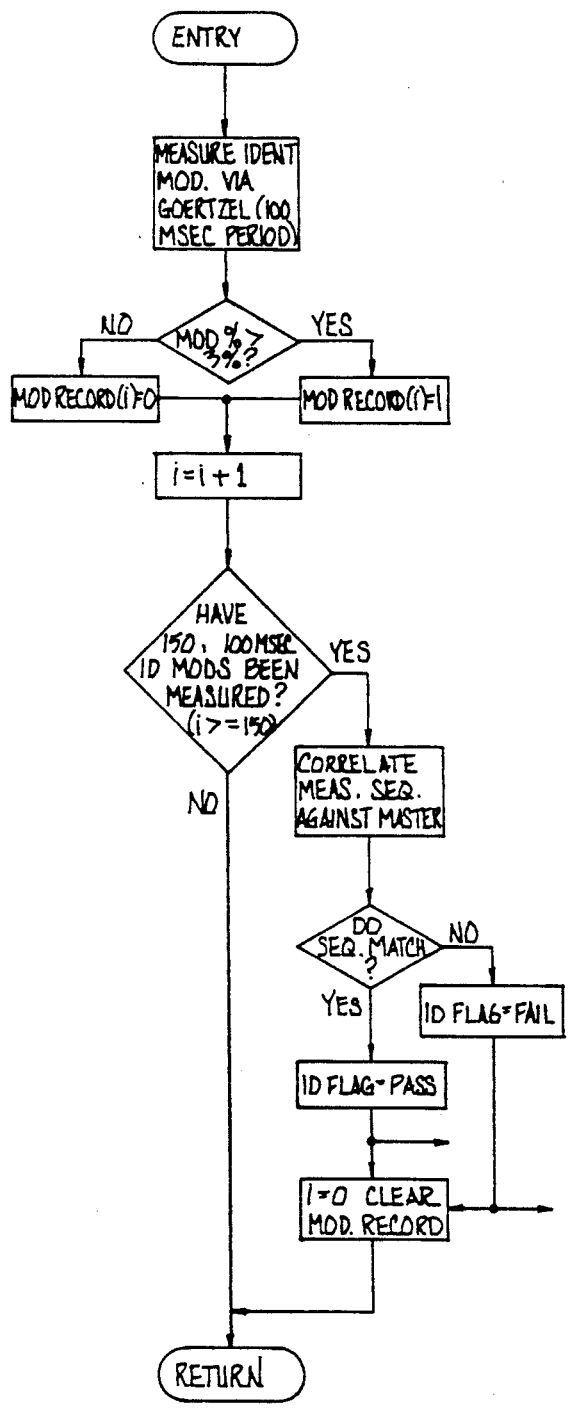
FIG. 17 is a detailed flow chart of the software that processes the identification tone.

A detail of the "process ident" task 126 is shown in FIG. 17. The initial subroutine measures or recovers the identification modulation using Goertzel's algorithm as discussed above. If the modulation percentage of the identification tone is at least three percent (five percent is the nominal modulation level), a binary "1" is input to the modulation record in storage memory; otherwise, no bit is added to the modulation record. After 150 iterations, the measured or recovered code sequence is correlated against the master code sequence. If the two sequences match, the identification code has passed the correlation test. The modulation record is cleared after either a pass or a fail and the test result is stored in the executive parameter file (FIG. 18C; see subroutine 162).

Figure 18A:
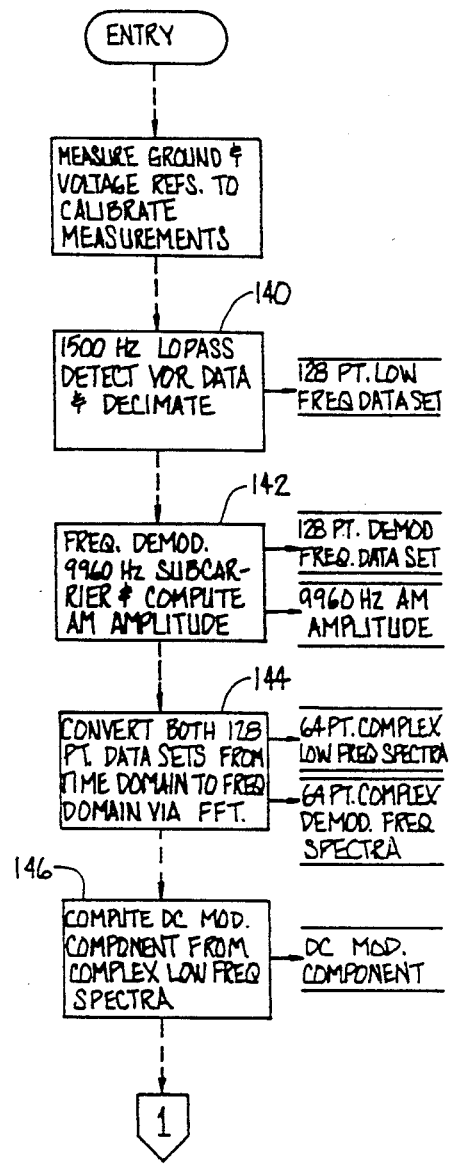
FIGS. 18A, 18B and 18C comprise a detailed flow chart of the software that processes the executive amplitude, phase and deviation ratio data.
Figure 18B:
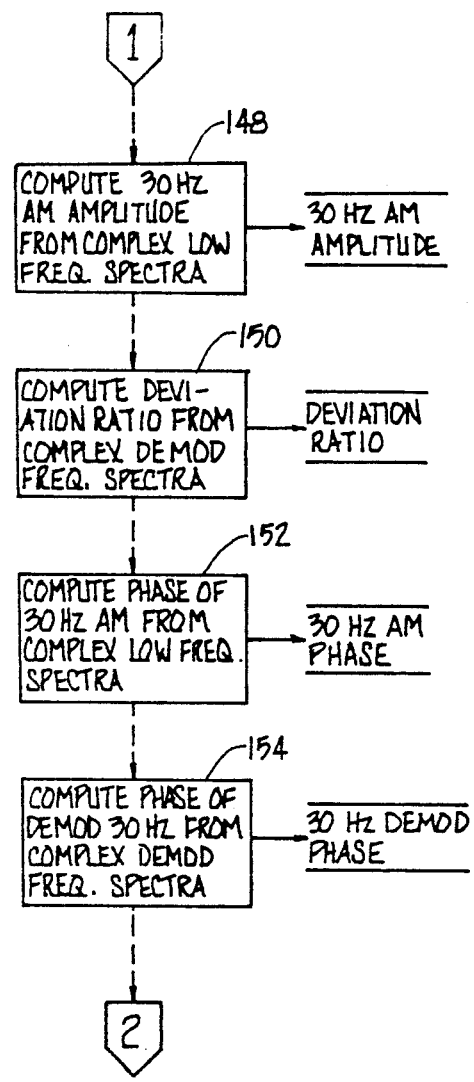
Figure 18C:
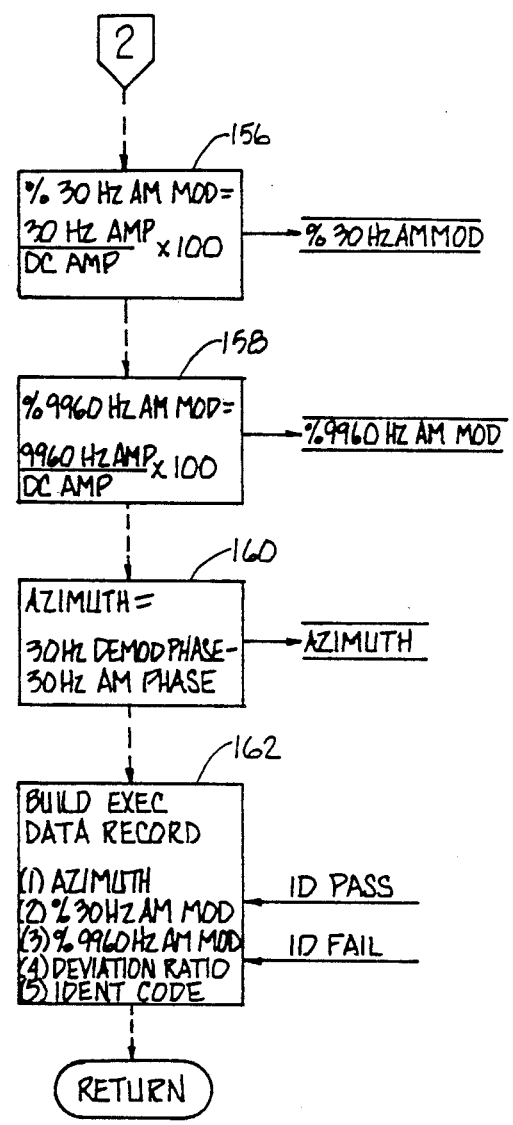

A detail of the "process exec. data" task 130 is shown in FIGS. 18A, 18B and 18C. After initial calibration, twelve subroutines execute the digital signal processing of the output data from the A/D converter 24. The first of these subroutines, illustrated at 140 in FIG. 18A, accomplishes the low pass filtering illustrated at 38 in FIG. 1 and described above. The resultant product is a 128-point low frequency data set appearing at output 40 and illustrated by waveform 40a in FIG. 4. This data set is an intermediate result which is stored in memory 106 (FIG. 15).

The other subroutines illustrated at 142, 144, 146, 48, 150, 152, 154, 156, 158, 160 and 162 in FIGS. 18A, 18B and 18C likewise execute the digital signal processing functions previously described. Subroutine 142 performs frequency demodulation of the 9960 Hz subcarrier and computes the amplitude of the subcarrier in accordance with the demodulator shown in detail in FIG. 2. The result is a 128-point demodulated data set illustrated by waveform 68a in FIG. 6, and the amplitude of the 9960 Hz subcarrier which appears on data line 72 (FIGS. 1 and 2).

Subroutine 144 executes the conversion from the time domain to the frequency domain via the FFT's 74 and 80 in FIG. 1. The result is the 64-point complex low frequency spectra shown in FIG. 5 and the 64-point demodulated frequency spectra shown in FIG. 7. Subroutine 146 computes the DC modulation component from the complex low frequency spectra, such component being seen at 82a in FIG. 5.

The remaining subroutines 148–162 and the products of such subroutines are seen in FIGS. 18B and 18C. The product of subroutine 148 is the 30 Hz AM amplitude illustrated at 86 in FIG. 5. The deviation ratio resulting from subroutine 150 is represented at 90 in the spectral graph of FIG. 7. The phase of the 30 Hz AM signal (30 Hz variable) is the arctangent of the real and imaginary parts of $L_2$ of the complex, low frequency spectra seen in FIG. 5. The phase of the demodulated 30 Hz component from the complex demodulated frequency spectra (FIG. 7) is computed by subroutine 154 by taking the arctangent of the real and imaginary parts of the spectra illustrated in FIG. 7. The result is the phase of the 30 Hz reference signal obtained by FM quadrature demodulation.

The remaining parameters are computed by the subroutines shown in FIG. 18C. In subroutine 156, the product is the percent modulation of the 30 Hz AM (variable) component, and the product of subroutine 158 is the modulation percentage of the 9960 Hz subcarrier. Azimuth, computed by subroutine 160, is the difference between the two, 30 Hz phases. The subroutine 162 builds a data record of the executive parameters in storage memory 106 (FIG. 15). Therefore, the executive data record is repeatedly updated by the operation of the program loop to provide continuous monitoring of the VOR signal.

What is claimed and desired to be secured by Letters Patent is as follows:

1. A method of extracting predetermined parameters of a VOR signal for evaluation to ensure that the transmitted signal in space remains within tolerance, said method comprising the steps of:
    subjecting the VOR signal to detection and presenting the detected signal as digital data,
    digitally processing said data in the time domain to derive the amplitude of a subcarrier included in said data, a reference signal applied to said subcarrier as frequency modulation, and a low frequency signal component having an azimuth-dependent phase appearing on said VOR signal as amplitude modulation,
    subjecting said reference signal and said signal component to further digital processing to extract amplitude and phase information therefrom, and
    computing said parameters from the extracted amplitude and phase information and the amplitude of said subcarrier.

2. The method as claimed in claim 1, wherein said step of digitally processing said data in the time domain includes subjecting said data to digital demodulation to detect said reference signal.

3. The method as claimed in claim 1, wherein said step of digitally processing said data in the time domain includes isolating a portion of said data to obtain a low frequency data set that includes said signal component.

4. The method as claimed in claim 1, wherein said step of subjecting said reference signal and signal component to further digital processing includes converting the reference signal and signal component from the time domain to the frequency domain and extracting said amplitude and phase information therefrom.

5. The method as claimed in claim 1, wherein said step of digitally processing said data in the time domain includes subjecting said data to digital demodulation to detect said reference signal, and wherein said step of subjecting said reference signal and signal component to further digital processing includes converting the reference signal and signal component from the time domain to the frequency domain and extracting said amplitude and phase information therefrom.

6. The method as claimed in claim 1, wherein said step of digitally processing said data in the time domain includes subjecting said data to FM quadrature demodulation to detect said reference signal, by transforming the subcarrier data into a form that represents the phase relationship of the modulated subcarrier, filtering the transformed signal to remove unwanted products and thereafter taking the arctangent thereof and correcting discontinuities in the arctangent function to provide a final demodulated waveform.

7. The method as claimed in claim 1, wherein said step of digitally processing said data in the time domain includes subjecting said data, without bandlimiting, to FM quadrature demodulation by transforming the subcarrier data into a form that represents the phase relationship of the modulated subcarrier, filtering the transformed signal to remove unwanted products, and thereafter taking the arctangent thereof and correcting discontinuities in the arctangent function to provide a final demodulated waveform of said reference signal, and computing the amplitude of said subcarrier from the filtered, transformed signal.

8. The method as claimed in claim 1, further comprising the steps of:
    repeatedly sampling said digital data to derive a data set that includes a recovered data sequence corresponding to an identification code sequence transmitted with said signal as modulation,
    recording said data set in memory to provide an identification code modulation record, and
    correlating the recovered data sequence from said record against a master data sequence identical to the sequence expected to be recovered, and determining whether or not the two sequences match.

9. A method of extracting azimuth information from a VOR signal for evaluation to ensure that the transmitted signal in space remains within tolerance, said method comprising the steps of:

subjecting the VOR signal to detection and presenting the detected signal as digital data,
digitally processing said data in the time domain to derive a reference signal component and a low frequency signal component having an azimuth-dependent phase, one of said components appearing on said VOR signal as amplitude modulation and the other of said components appearing thereon as frequency modulation,
subjecting said signal components to further digital processing to extract phase information therefrom, and
determining from said phase information the relative phase between said signal components.

10. The method as claimed in claim 9, wherein said step of digitally processing said data in the time domain includes subjecting said data to digital demodulation to detect said signal component appearing as frequency modulation.

11. The method as claimed in claim 9, wherein said step of subjecting said signal components to further digital processing includes converting the signal components from the time domain to the frequency domain and extracting said phase information therefrom.

12. The method as claimed in claim 9, wherein said step of digitally processing said data in the time domain includes subjecting said data to digital demodulation to detect said signal component appearing as frequency modulation, and wherein said step of subjecting said signal components to further digital processing includes converting the signal components from the time domain to the frequency domain and extracting said phase information therefrom.

13. The method as claimed in claim 9, wherein said signal component appearing as frequency modulation is applied to a subcarrier included in said data, and wherein said step of digitally processing said data in the time domain includes subjecting said data to FM quadrature demodulation to detect said signal component appearing as frequency modulation, by transforming the subcarrier data into a form that represents the phase relationship of the modulated subcarrier, filtering the transformed signal to remove unwanted products and thereafter taking the arctangent thereof and correcting discontinuities in the arctangent function to provide a final demodulated waveform.

14. Apparatus for extracting predetermined parameters of a VOR signal for evaluation to ensure that the transmitted signal in space remains within tolerance, said apparatus comprising:
means responsive to the VOR signal for subjecting the same to detection and presenting the detected signal as digital data in the time domain,
time domain processing means responsive to said digital data for digitally processing said data in the time domain to derive the amplitude of a subcarrier included in said data, a reference signal applied to said subcarrier as frequency modulation, and a low frequency signal component having an azimuth-dependent phase appearing on said VOR signal as amplitude modulation,
frequency domain processing means for receiving said reference signal and said signal component and digitally processing the same to extract amplitude and phase information therefrom, and
means for computing said parameters from the extracted amplitude and phase information and the amplitude of said subcarrier.

15. The apparatus as claimed in claim 14, wherein said time domain processing means includes means for subjecting said data to digital demodulation to detect said reference signal.

16. The apparatus as claimed in claim 14, wherein said time domain processing means includes filter means for isolating a portion of said data to obtain a low frequency data set that includes said signal component.

17. The apparatus as claimed in claim 14, wherein said frequency domain processing means includes means for converting the reference signal and signal component from the time domain to the frequency domain and extracting said amplitude and phase information therefrom.

18. The apparatus as claimed in claim 14, wherein said time domain processing means includes means for subjecting said data to digital demodulation to detect said reference signal, and wherein said frequency domain processing means includes means for converting the reference signal and signal component from the time domain to the frequency domain and extracting said amplitude and phase information therefrom.

19. The apparatus as claimed in claim 14, wherein said time domain processing means includes an FM quadrature demodulator for detecting said reference signal, said demodulator comprising means for transforming the subcarrier data into a form that represents the phase relationship of the modulated subcarrier, means for filtering the transformed signal to remove unwanted products, means responsive to the filtered, transformed signal for deriving the arctangent thereof, and means for correcting discontinuities in the arctangent function to provide a final demodulated waveform.

20. The apparatus as claimed in claim 14, wherein said time domain processing means includes an FM quadrature demodulator responsive to essentially the entirety of said data for detecting said reference signal, said demodulator comprising means for transforming the subcarrier data into a form that represents the phase relationship of the modulated subcarrier, means for filtering the transformed signal to remove unwanted products, means responsive to the filtered, transformed signal for deriving the arctangent thereof and correcting discontinuities in the arctangent function to provide a final demodulated waveform of said reference signal, and means for computing the amplitude of said subcarrier from the filtered, transformed signal.

21. Apparatus for extracting azimuth information from a VOR signal for evaluation to ensure that the transmitted signal in space remains within tolerance, said apparatus comprising:
means responsive to the VOR signal for subjecting the same to detection and presenting the detected signal as digital data in the time domain,
time domain processing means responsive to said digital data for digitally processing said data in the time domain to derive a reference signal component and a low frequency signal component having an azimuth-dependent phase, one of said components appearing on said VOR signal as amplitude modulation and the other of said components appearing thereon as frequency modulation,
frequency domain processing means for receiving said signal components and digitally processing the same to extract phase information therefrom, and
means for determining from said phase information the relative phase between said signal components.

22. The apparatus as claimed in claim 21, wherein said time domain processing means includes means for subjecting said data to digital demodulation to detect said signal component appearing as frequency modulation, and wherein said frequency domain processing means includes means for converting the signal components from the time domain to the frequency domain and extracting said phase information therefrom.

23. The apparatus as claimed in claim 21, wherein said signal component appearing as frequency modulation is applied to a subcarrier included in said data, and wherein said time domain processing means includes an FM quadrature demodulator for detecting said signal component appearing as frequency modulation, said demodulator comprising means for transforming the subcarrier data into a form that represents the phase relationship of the modulated subcarrier, means for filtering the transformed signal to remove unwanted products, means responsive to the filtered, transformed signal for deriving the arctangent thereof, and means for correcting discontinuities in the arctangent function to provide a final demodulated waveform.

24. A method of demodulating a navigation signal to verify an identification code sequence transmitted with the signal as modulation, said method comprising the steps of:
 subjecting the navigation signal to detection and presenting the detected signal as digital data,
 repeatedly sampling said digital data to derive a data set that includes a recovered data sequence corresponding to said identification code sequence, and
 correlating the recovered data sequence against a master data sequence identical to the sequence expected to be recovered, and determining whether or not the tow sequences match.

25. The method as claimed in claim 24, wherein is provided the additional step of recording said data set in memory to provide an identification code modulation record, and wherein in said correlation step the recovered data sequence from said record is correlated against said master data sequence.

26. The method as claimed in claim 24, further comprising the steps of:
 establishing a modulation threshold for said data set, and
 deleting from said record all data below said threshold.

* * * * *